United States Patent [19]

Dahmen et al.

[11] Patent Number: 5,644,972
[45] Date of Patent: Jul. 8, 1997

[54] SYSTEM AND METHOD FOR BREWING AND DISPENSING A HOT BEVERAGE

[75] Inventors: William A. Dahmen, Ingleside, Ill.; Christopher Paul Lojacono, Seattle, Wash.; Zbigniew Malec, River Grove, Ill.

[73] Assignees: American Metal Ware Co.; Starbucks Coffee Company

[21] Appl. No.: 285,044

[22] Filed: Aug. 3, 1994

[51] Int. Cl.⁶ .............................. A47J 31/40; A47J 31/46
[52] U.S. Cl. .................. 99/280; 99/285; 99/290; 426/433
[58] Field of Search .................. 99/290, 279, 280, 99/281, 282, 283, 289, 285, 288, 289 R, 291, 293, 295, 298, 299, 310; 426/433

[56] References Cited

U.S. PATENT DOCUMENTS

| | | |
|---|---|---|
| 3,843,027 | 10/1974 | Wilson et al. . |
| 4,165,681 | 8/1979 | Belinkoff . |
| 4,187,150 | 2/1980 | Rich . |
| 4,363,262 | 12/1982 | Pinckley et al. . |
| 4,386,556 | 6/1983 | Romey, Sr. . |
| 4,406,382 | 9/1983 | Roth . |
| 4,621,571 | 11/1986 | Roberts ........................ 99/290 |
| 4,703,686 | 11/1987 | Siegfried . |
| 4,732,297 | 3/1988 | Schroeder, Jr. . |
| 4,773,313 | 9/1988 | Anson ........................ 99/290 |
| 4,790,239 | 12/1988 | Hewitt . |
| 4,833,978 | 5/1989 | Martone et al. . |
| 4,997,015 | 3/1991 | Johnson . |
| 5,111,974 | 5/1992 | Parker . |
| 5,199,609 | 4/1993 | Ash, Jr. . |

*Primary Examiner*—Robert W. Jenkins
*Attorney, Agent, or Firm*—Seyfarth, Shaw, Fairweather & Geraldson

[57] ABSTRACT

The present invention comprises a system for brewing and dispensing high quality beverages at remote locations comprising a high volume urn, a high volume transfer system, an insulated mobile canister, a dispensing system having a compressor, tank and hose assembly, and a dispensing tap. Coffee, or other brewed beverage, is brewed in the high volume urn. Once a complete batch of coffee has been brewed, the entire batch is transferred via gravity to a clean and empty mobile canister. Once full, the mobile canister can be moved to a remote dispensing location or stored for future use. When the mobile canister is moved to the dispensing location it is connected to the dispensing system which uses an air compressor to pressurize the beverage within mobile canister. The dispensing system also connects the canister to the dispensing tap, via a short, removable dispensing hose. The dispensing hose is wrapped with an electrical heater to maintain the beverage at the optimum serving temperature at the dispensing tap while keeping it below the temperature at which degradation occurs. When the dispensing tap is opened, the beverage is dispensed.

26 Claims, 3 Drawing Sheets

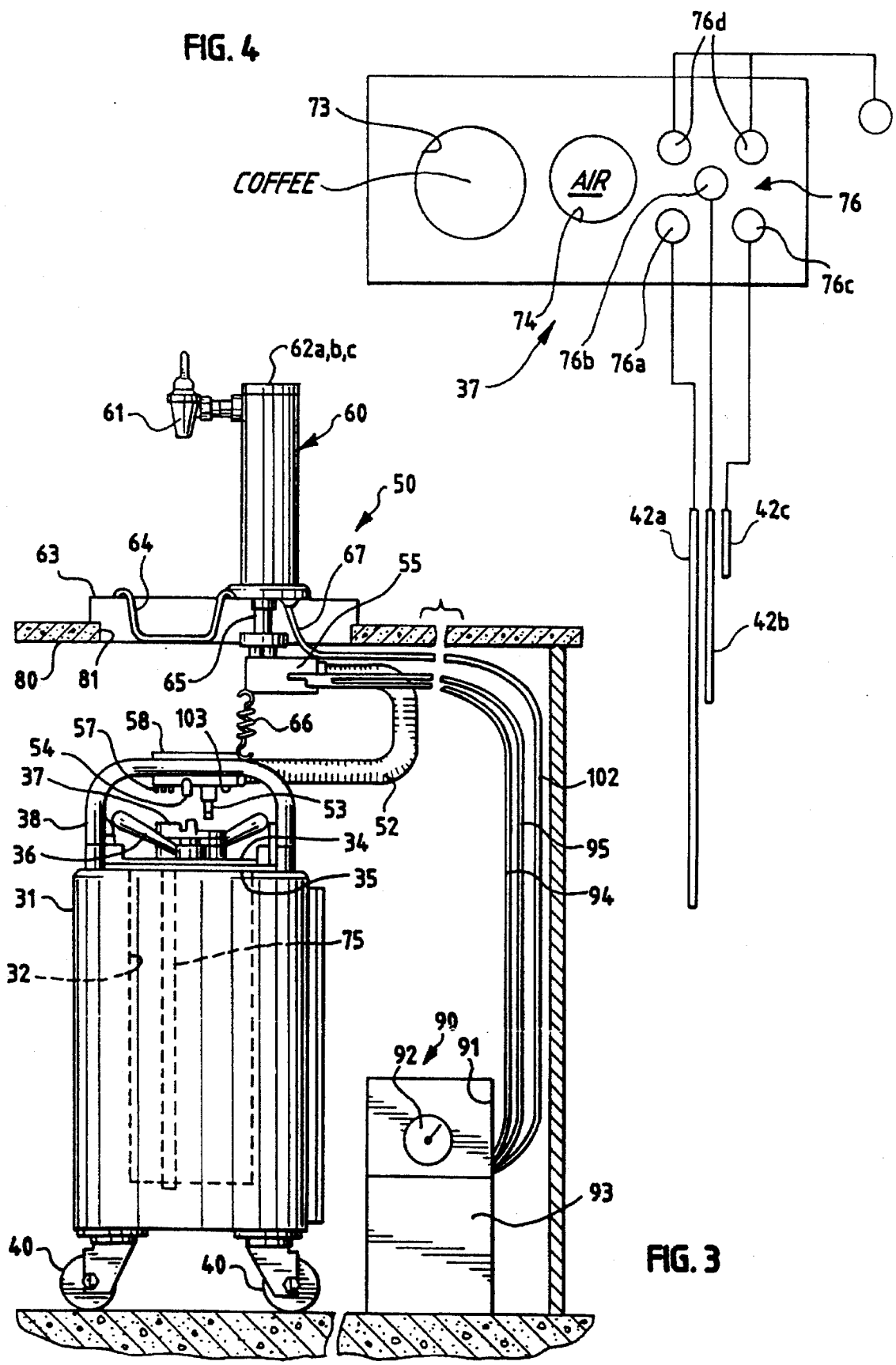

SYSTEM AND METHOD FOR BREWING AND DISPENSING A HOT BEVERAGE

BACKGROUND OF THE INVENTION

This invention relates to a system and a method for brewing and dispensing hot beverages. Specifically, this invention relates to a system and method for brewing a beverage, such as coffee, at high temperature at one location, transporting the brewed beverage to a remote dispensing location while maintaining the beverage at a lower, optimum serving temperature, and dispensing the hot beverage at the remote location. Typical applications for this invention include both institutional facilities, such as restaurants and banquet halls, and retail specialty stores. Most institutional and retail beverage facilities rely on conventional brewing products to brew and dispense hot beverages. Conventional products include 12 cup glass bottle brewers, mid capacity, portable container brewers, or larger capacity urn type brewers. Each of these conventional systems presents problems to its operators.

One problem with conventional systems is degradation of the quality of the brewed beverage. In conventional systems, the beverage is often brewed and stored in the same container; the glass bottle or urn vessel. Storing the brewed beverage in the same vessel at high temperature often results in degradation of the quality of the beverage. The small glass bottle brewers are the most common type used in retail facilities. The operator brews the beverage into the small glass bottle at one location and either leaves the bottle on a warmer at the brewing location or moves the bottle to a remote storage and dispensing location. The remote location typically includes a heated warmer on which the glass bottle is stored when the beverage is not being dispensed. The heated warmer is intended to maintain the beverage at a desired serving temperature. However, typically the warmer has a single heat setting independent of the volume of beverage being warmed. Accordingly, the temperature of the beverage varies depending on the volume contained in the glass bottle. The mid-sized brewer may include an insulated or non-insulated storage container which can be moved to a remote location for dispensing. The non-insulated storage container must be placed on a warmer to maintain the serving temperature of the beverage. The warmer of the mid-sized brewer has the same problem as the glass bottle brewer; degrading coffee quality. The urn brewing system also degrades the quality of the beverage. The urn is a large vessel consisting of one, two, or three product liners surrounded by a tank of water. The water in the tank is used to brew the beverage and is, therefore, maintained at approximately 200° F. After brewing, the water in the tank maintains the temperature of the brewed beverage at approximately 200° F. which degrades the beverage quality over time. In specialty retail facilities, brewed beverages must be able to be stored at serving temperature for at least one hour without degrading the quality of the beverage. In institutional facilities, the brewed beverage must be able to be stored at serving temperature for at least two hours without degradation. Conventional brewing systems do not allow for these longer storage times without degrading the quality of the beverage.

Another problem with some of the conventional brewing systems is volume. The glass bottle brewing system can only brew about 12 cups at a time. Accordingly, to brew larger volumes of beverages, multiple brewers and brew locations are required. The mid-sized brewer is capable of brewing larger quantities, approximately one to one and one-half gallons. However, for most institutional and specialty retail facilities, neither of these systems is capable of producing sufficient quantities of brewed beverages. In addition, it is desirable to have one, central brew location which cannot be accomplished by either of these systems for high volume production.

Yet another problem with conventional urn brewing systems is the manual transfer of the beverage from the brewing vessel to the storage or remote dispensing vessel. Such manual transfer is awkward and inefficient.

In specialty retail facilities, it is desirable to have an appealing cafe atmosphere and to maintain direct eye contact with the customers. Accordingly, large brewing equipment or storage containers cannot be placed on the service counters. However, efficiency demands that the personnel serving the customers be able to quickly and efficiently dispense large volumes of hot beverages in single servings.

One solution to the problems discussed above was suggested in U.S. Pat. No. 4,790,239 (HEWITT). HEWITT disclosed a conventional brewing urn for brewing coffee. The brewed coffee is transferred to a holding tank located in an available location in the facility. The beverage is transferred either via gravity feed or via a gravity assist centrifugal pump. A pressure pump pressurizes the holding tank to force the coffee through a series of conduits to one or more dispensing taps. The holding tank and the conduits are permanently plumbed into the facility and, in some cases, the length of the conduits may exceed sixty feet. A circulating hot water line is used to heat the beverage in the conduits and in the holding tank.

While HEWITT attempts to solve some of the problems discussed above, it presents further problems for the operator of the beverage facility. The extreme length of the conduits causes the beverage to lose temperature and degrade in quality. The complexity of the system also presents maintenance problems. HEWITT consists of many conduits, switches, and pumps. Since the conduits are permanently plumbed into the facility, typically under the service counters, cleaning and repair operations are difficult. In addition, the centrifugal gravity assist pumps cause unnecessary churning of the beverage further degrading the quality. The permanent installation precludes remote dispensing in locations other than those for which the permanent plumbing has provided.

SUMMARY OF THE INVENTION

The present invention comprises a system for brewing and dispensing high quality beverages at remote locations comprising a high volume urn, a high volume transfer system, an insulated mobile canister, a dispensing system having a compressor, tank and hose assembly, and a dispensing tap. Coffee, or other brewed beverage, is brewed in the high volume urn. Once a complete batch of coffee has been brewed, the entire batch is transferred via gravity to a clean and empty mobile canister. Once full, the mobile canister can be moved to a remote dispensing location or stored for future use. When the mobile canister is moved to the dispensing location it is connected to the dispensing system which uses an air compressor to pressurize the mobile canister. The dispensing system also connects the canister to the dispensing tap, via a short, removable dispensing hose. The dispensing hose is wrapped with an electrical heater to maintain the beverage at the optimum serving temperature at the dispensing tap while keeping it below the temperature at which degradation occurs. When the dispensing tap is opened, the beverage is dispensed.

The system also includes control circuitry and sensors to prevent the transfer of a new batch of coffee into a mobile canister that already contains an old batch of coffee. The control circuitry also provides low and full level indicators in the canister. Additional automation and safety circuitry is provided as discussed more fully herein.

It is therefore an important object of this invention to provide a system to brew and dispense large volumes of high quality brewed beverages.

Another object of this invention is to provide for optimum control by the operator over the brewing and dispensing operation.

It is yet another object of this invention that the brewed beverage be held for at least two hours without degrading the quality of the beverage.

Another object of this invention is to provide a system capable of brewing large volumes of high quality beverages efficiently.

Yet another object of this invention is to provide a system for brewing and dispensing beverages that allows eye to eye contact between the customer and the operator of the system.

Another object of this invention is to provide a system as described above that is also easy and efficient to maintain.

The invention consists of certain novel features and a combination of parts hereinafter fully described, illustrated in the accompanying drawings and particular pointed out in the appended claims, it being understood that various changes in the details may be made without departing from the spirit or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 3 is a side view of the dispensing portion of the system.

FIG. 4 is a schematic representation of the dispensing connector and sensor interface.

DETAILED DESCRIPTION OF THE PREFERRED EMBODIMENT

Figure 1:
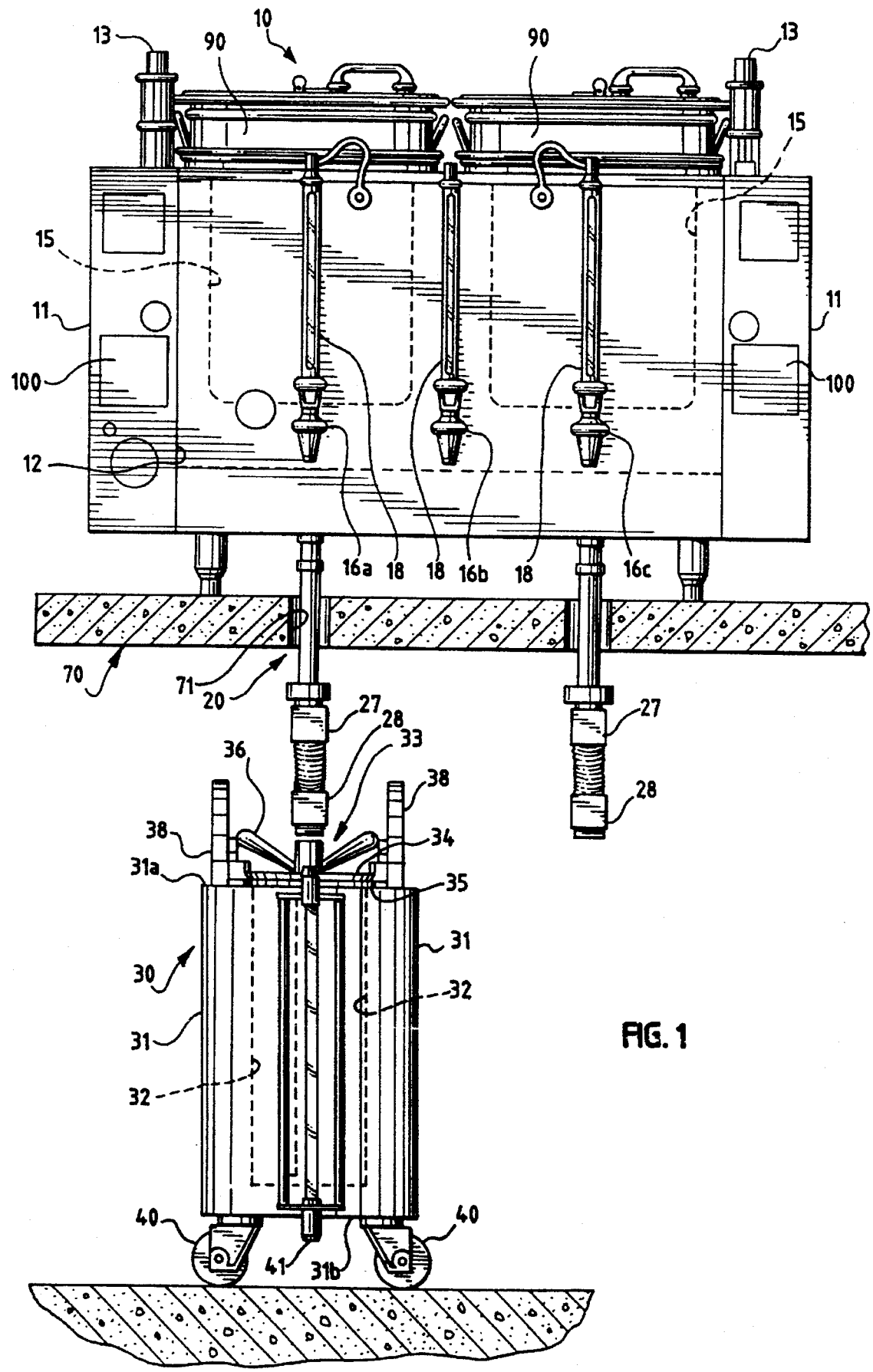
FIG. 1 is a plan view of the brewing and transfer portion of the system.
Figure 2:
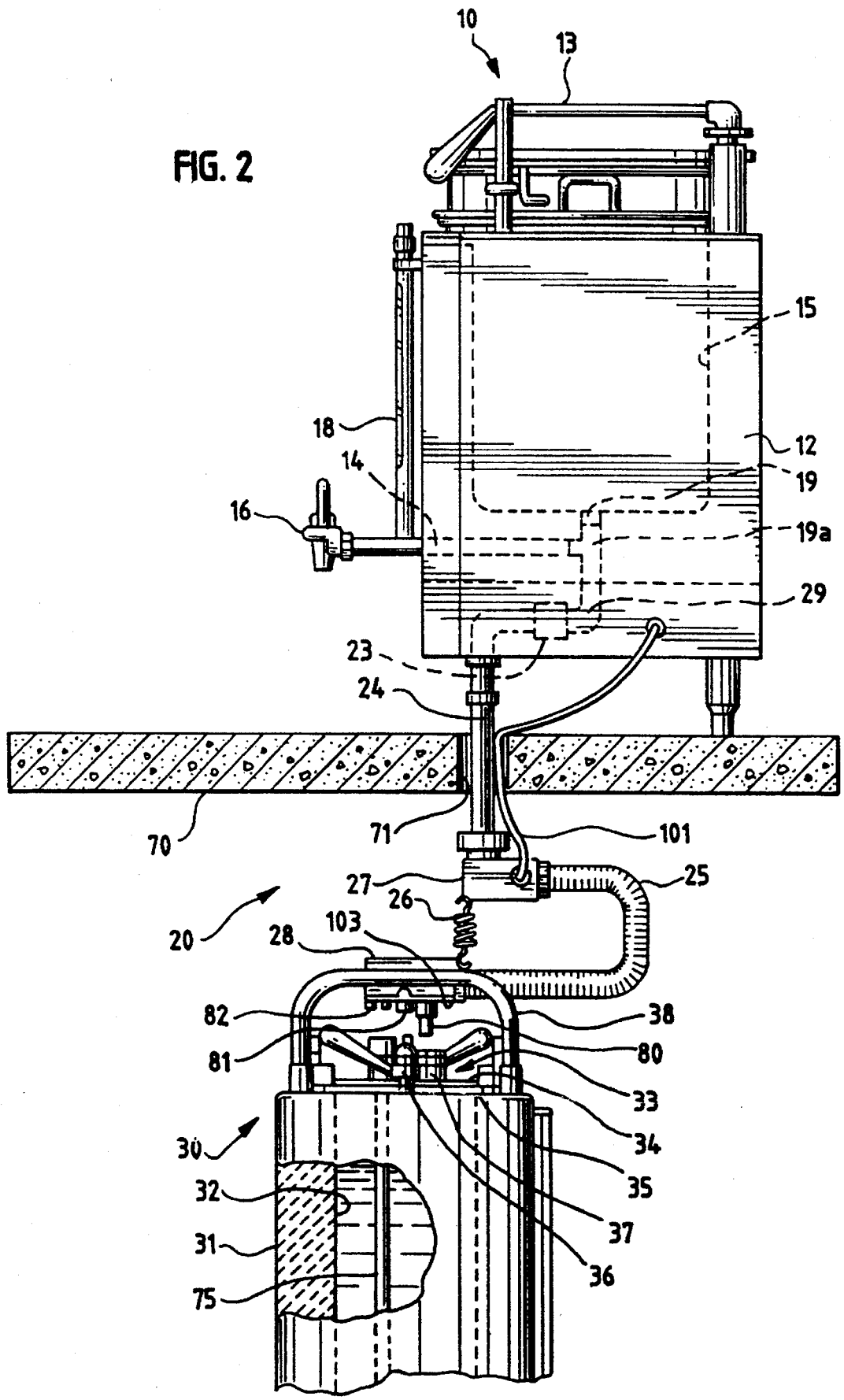
FIG. 2 is a side view of FIG. 1.

Turning now to FIG. 1, a high volume brewing system is shown. The brewing system includes a conventional high volume urn 10, such as the Model 8773E urn manufactured by American Metal Ware Co. of Northbrook, Ill. In the preferred embodiment, urn 10 includes a water tank 12, two cylindrical beverage liners 15 each having a capacity of three gallons, two brew baskets 90, two spray arms 13 and two control enclosures 11 for housing the brew control circuitry. Water tank 12 includes heating elements (not shown) for heating the water contained in tank 12. In the preferred embodiment, three nickel plated copper resistance heating elements are used to provide 15 kW of power to the water in tank 12. The heating elements are controlled by a thermostat having four settings; OFF, STANDBY (120° F.), HOLD (180° F.), and BREW (200° F.). The thermostat monitors the water temperature at one location in close proximity to both the heater element and the water inlet to turn the heaters on whenever cold water enters tank 12 or whenever the water temperature drops below the present level. The heated water is used for brewing beverages as well as maintaining the temperature of brewed beverages. Tank 12 surrounds beverage liners 15 thereby insulating liners 15 from the ambient environment. The heated water may also be dispensed via a faucet or tap 16b located at the front of urn 10. Brewed beverages may be dispensed via faucets 16a and c which are connected by a conduit to the bottom of each respective beverage liner 15 (FIG. 2). Each liner has a bottom drain 19 connecting it to its respective faucet or tap 16 via a stainless steel conduit 14. Beverages and hot water are fed to faucets 16 by gravity and the fluid levels in the liners 15 and the tank 12 are indicated in three independent site-glasses 18 located above and in fluid connection with faucets 16. Control enclosures 11 are located on each side of urn 10 containing circuitry for respectively and independently controlling the function of brewing beverages into each beverage liner 15 (described more fully below).

In operation, the operator decides the size of the batch of brewed beverage, such as coffee, that is desired. An appropriate amount of ground coffee is then placed into the respective filter located in the brewing basket(s) 90. The operator then places the brew basket 90 over an empty liner 15 and positions spray arm 13 over that liner 15. The operator then initiates the brew cycle by pressing the brew start timer 100 on the face of the control enclosure 11. The preheated water (approximately 200° F.) is pumped from the tank 12 through spray arm 13 and over the ground coffee. Simultaneous brewing allows two separate beverages to be prepared at the same time; that is, different flavored coffees can be prepared simultaneously. The flow rate through each spray arm 13 is constant and the length of the brew cycle is controlled by the programmable digital timer 100 to achieve a high quality and repeatable brewed beverage. The American Metal Ware urn, Model 8773E, allows simultaneous brewing into both liners 15. After the brew cycle, the urn 10 readies the coffee for use. The timer 100 counts down the drip period which is followed by an agitation cycle. While the coffee is agitating, the used coffee grounds may be discarded. During and after the agitation cycle, the temperature of the coffee is maintained by the hot water in the tank 12. In a conventional system, the coffee is then dispensed in single servings or into carafes from faucet 16.

The conventional urn 10 is modified in the present invention in a number of ways. Inserted into the stainless steel conduit 14 is a T-shaped coupling 19a. Coupling 19a allows fluid to flow to either the respective faucet 16a or c or to a high volume transfer system 20, described more fully below. The brew control circuitry of urn 10 is also modified in the present invention. In addition to the conventional brew control described above, the present invention includes control of the high volume transfer system.

Referring to FIG. 2, it can be seen that transfer system 20 includes a transfer valve 23, an extension tube 24, transfer outlet block 28, transfer hose 25, and a transfer inlet block 27, together referred to as the transfer hose assembly. Extension tube 24 extends downward from coupling 19a to transfer valve 23. Extension tube 24 continues downward from the outlet of transfer valve 23 to transfer inlet block 27. A flexible nylon conduit 25 extends from transfer inlet block 27 to transfer outlet block 28. Extending through flexible nylon conduit 25 is a silicon tube for carrying the brewed beverage and electrical control lines for controlling the transfer of liquid. Electric power lines 101 extend from the control enclosure 11 to the inlet block 27 and exit through block 27. Conduit 25 terminates at transfer outlet block 28. Outlet block 28 is made of FDA approved Eralyte PET plastic and includes a male liquid outlet orifice 80, a liquid inlet orifice 81 (not shown), and a plurality of sockets for holding spring loaded electrical contacts 82. The silicone tubing is secured to outlet block 28 by barbed fittings. The electrical conductors are secured to electrical contacts 82 in block 28 by soldering or other conventional means. Nylon conduit 25 is loosely formed into a flexible C-shape to provide strain relief and flexibility and is loosely held in position by a spring 26. Liquid outlet orifice 80 is cylindrical having an annular groove for receiving an O-ring at its free end. Block 28 also includes a spring loaded clip which locks the block 28 to the canister 30 (described more fully below).

In the typical application, urn 10 is located on a counter 70 or other suitable raised structure. Counter 70 includes at least one aperture 71 through which extension tube 24 passes. In addition, other apertures may be provided for water and electrical access.

Referring now to FIG. 1, a mobile canister 30 is shown. In the preferred embodiment, canister 30 has a three gallon internal capacity and includes a body portion 31, an interior liner portion 32 and an insulated portion therebetween. Canister 30 has a cylindrical shape and liner 32 is centered therein. Body portion 31 is made of stainless steel and has a top plate 31a welded thereto and a bottom cover 31b threadably secured opposite the top plate 31a. Attached to the bottom cover 31b are four casters 40.

Interior liner 32 is cylindrical in the preferred embodiment and fits into body 31. The diameter of liner 32 is smaller than that of body 31 thereby creating an insulation space between body 31 and liner 32. This space is filled with foam insulation which insulates the beverage inside the liner 32 and provides structural rigidity to body 31. Liner 32 is sealed with silicone caulking at the interface between top plate 31a and liner 32. Liner 32 includes a bottom drain 41 for manually draining the contents thereof. Secured to top plate 31a by conventional means, such as screws, are two C-shaped handles 38 (FIG. 3). Between handles 38 is a lid assembly 33 including a two piece lid 34, a rubber gasket located between the two pieces of lid 34, and a means for securing lid assembly to top plate 31a. In the preferred embodiment, the securing means includes four cam shaped locks 36. These locks 36 provide a pressure tight seal between the lid gasket 34 and the liner 32. The operator seals the canister by turning each of the locks 36 one-half revolution.

Referring to FIG. 2, also attached to the lid 34 is the lid block 37. Lid block 37 is made of PET plastic, such as, Polymer Corporation's Eralyte. Referring to FIG. 4, block 37 contains two apertures 73 and 74 which allow liquid, such as coffee, and compressed air to enter the canister 30. Block 37 also contains sockets for receiving electrical contacts 76 used to conduct signals from fluid level sensors 42 in the canister 30. In the preferred embodiment, block 37 has five sockets in which brass electrical contacts 76 are received. The sockets are sized to create a press fit when the electrical contacts 76 are received therein. Level probes 42 are electrically connected to the electrical contacts and secured by conventional means, such as screws. Electrical contact 76a is connected to level probe 42a, electrical contact 76b is connected to level probe 42b and electrical contact 76c is connected to level probe 42c. Level probes 42a, b, and c indicate liquid levels in the canister 30 at empty, half full, and full levels respectively. The remaining two electrical contacts 76d are connected to a common return. Block 28 is designed to quickly couple and un-couple from canister lid block 37 thereby creating a "quick-coupling" connection.

Block 28 and lid block 37 are configured for mating engagement when they are coupled together. Specifically, the male liquid outlet orifice 80 of block 28 is configured to couple to the female liquid inlet orifice 73 of lid block 37 so that a mating interface 103 and a continuous liquid conduit are created for receiving liquid when block 28 and lid block 37 are removably coupled together. Similarly, electrical contacts 76 are configured for mating connection to electrical contacts 82 when block 28 and lid block 37 are coupled. The male liquid orifice 80 and the female liquid orifice 73 mate below the mating interface 103.

Referring now to FIG. 3, a stainless steel coffee pickup tube 75 is welded to a threaded fitting (not shown) which in turn passes through a clearance hole in lid 34 and threadably engages lid block 37 thereby securing lid block 37 to lid 34. Similarly, an air fitting (not shown) passes through a clearance hole in lid 34 and threadably engages lid block 37. Lid block 37 also includes a groove around its perimeter for receiving silicone caulking which seals lid block 37 to lid 34 when they are assembled together.

FIG. 3 also shows a beverage dispensing system 50 mounted in a dispensing counter 80. Dispensing system 50 is mounted in an aperture 81 in counter 80 and includes a tower 60 having a base 64, faucet or tap 61, drip pan 63, indicator lights 62 and dispense hose assembly 52. Housed within hose assembly 52 is a silicone beverage hose and a silicone air hose. Attached to the end of hose assembly 52 is a connector block 58 having therein electrical conductors 57. Tower 60 is of generally conventional design resting on base 64 which is made of stainless steel. Inserted into base 64 is a drain pan 63. Tower 60 is screwed into the base 64. The tower 60 is a hollow cylinder having inside a conduit 65 for delivering coffee to the faucet 61. The conduit is made of stainless steel and brass and is wrapped in foil backed resistance heat tape to keep the coffee at the optimum serving temperature. On top of the tower 60 are indicator lights 62a and 62b for indicating the fluid level in canister 30. Also on the top of tower 60 is a switch 62c. Exiting the bottom of tower 60 and base 64 is the fluid conduit 65 and electrical conductors 67. Conduit 65 connects to dispense hose assembly 52.

The dispense hose assembly 52 is similar to the transfer hose assembly containing a silicone coffee hose (not shown) wrapped in foil backed heating tape, a silicone air hose, inlet connector block 58 and outlet connector block 55. The dispense hose assembly connects the dispensing tower 60 to the canister 30.

Air compressor 90 is also part of the dispensing system 50 and is of conventional design with the addition of specialized controls for application to the present invention. The compressor 90 includes a stainless steel air tank 93 which is seam welded to form an air tight enclosure. Compressor 90 also includes cover 91, controls and pressure gauge 92 and a compressor pump (not shown). The compressor pump is housed with the compressor controls inside cover 91. Pressure gauge 92 extends through an aperture in cover 91 for viewing. Compressed air is supplied by compressor 90 through supply line 94. The supply line 94 connects the compressor 90 to outlet block 55. An electric power line 102 connects compressor 90 to switch 62c located at the top of tower 60.

Inlet block 58 is designed to quickly couple and uncouple with lid block 37 thereby creating a "quick-coupling" connection. Block 58 and lid block 37 are configured for mating engagement when they are coupled together thereby creating a mating interface 103 and continuous conduits for both liquid and compressed air. Specifically, liquid orifice 53 in block 58 is a male fitting configured to mate below interface 103 with the female liquid inlet orifice 73 of lid block 37. Similarly, air orifice 54 of block 58 is configured to mate below interface 103 with air orifice 74 of lid block 37. Block 58 has spring clips for removably securing it to lid block 37 for easy coupling and uncoupling.

The control circuitry of preferred embodiment of the present invention includes numerous safety features which will be described in connection with the operation of the system. The operation of the system begins by brewing a batch of a beverage such as coffee. Water is added to the tank 12 of urn 10 typically through a hard plumbed water line. The water level is maintained by monitoring the water level and activating solenoid valves in response to the level dropping below a predetermined level. This water is heated by the resistance heaters in the tank 12. Urn 10 includes fluid level probes (not shown) to monitor the water level to ensure that the resistance heaters can only operate if they are emersed in and covered by the water. Once the water reaches brewing temperature, approximately 200° F., the operator decides what size batch of coffee is needed and loads a corresponding amount of ground coffee into a paper filter. The paper filter is placed in the basket 90 over a clean and empty liner 15. Spray arm 13 is positioned over the brew basket 90 and the operator presses the brew start control initiating the brew cycle on the digital timer 100. The timer sends an electrical signal to a relay that causes a water pump to pump water from tank 12 to spray arm 13. The spray arm 13 sprays hot water over the coffee grounds. When the proper amount of time has passed for the given batch size, the timer times out and the pump is deactivated stopping the water flow. After the brew cycle, the urn 10 readies the coffee for use. The timer 100 counts down a drip period corresponding to the batch size selected. The drip period is followed by an agitation cycle during which the brewed coffee is mechanically agitated to blend the brewed coffee to achieve uniformity. During the agitation cycle the operator can discard the used coffee grounds and prepare for the next brewing batch. After the agitation cycle, the coffee is ready for use and can be transferred to a mobile canister 30.

Canister 30 is positioned directly under the liner 12 of urn 10 containing the brewed coffee. Referring to FIG. 2, transfer outlet block 28 is connected to lid block 37 on top of canister 30. Connection of block 28 to block 37 creates a continuous conduit for the coffee to pass from urn liner 12 to canister liner 32. The connection also provides electrical contact between level sensors 42 and control circuitry and activates an indicator on the control enclosure 11 indicating "CANISTER CONNECTED." The control circuitry senses, through continuity sensors 42, the fluid level in canister liner 32. If all three level sensors 42 indicate that canister liner 32 is empty, a second indicator on the control enclosure is activated showing "CANISTER EMPTY." The operator then initiates the transfer of the brewed coffee by pressing the transfer start control which activates transfer valve 23 allowing coffee to flow, under gravity, from the urn liner 12 to the canister liner 32. A third indicator is activated indicating the "TRANSFERRING" cycle has begun. The operator may stop the transfer at any time by pressing the transfer stop control which deactivates and shuts the transfer valve 23. The control circuitry will not allow the coffee to be transferred unless the sensors 42 indicate that the canister is empty. This safeguard prevents a canister from being over filled and prevents the mixing of freshly brewed coffee with previously brewed coffee. In addition, the sensors monitor the fluid level in the canister during the transfer cycle and deactivate the transfer valve 23 if the full level sensor 42c indicates the fluid level has reached the predetermined threshold. Finally, the control circuitry will deactivate the transfer valve 23 if the transfer hose assembly is disconnected from lid block 37.

Once the transfer cycle is complete, the operator disconnects the transfer outlet block 28 from lid block 37 by lifting up on block 28 while pressing a lock release. The removal of block 28 from block 37 breaks the continuity of the transfer control signal deactivating valve 23 thereby preventing any further flow from urn liner 15. Canister 30 is then rolled to a remote dispensing station. Canister 30 is positioned under dispensing system 50 and lid block 37 is connected to dispensing hose assembly 52. Again the level probes 42 are used to monitor fluid level in the canister and to control the dispensing system as described below. The level probes 42 indicate that the canister 30 is connected to the dispensing system 50. The operator can now initiate dispensing by activating switch 62c which sends a signal to a relay controlling power to compressor 90. The relay also receives signals from the level probes 42 such that the compressor 90 cannot be energized unless the switch 62c is on and the fluid level probes 42 indicate that the canister 30 is not empty. If these conditions are met, the compressor 90 is energized and compressed air is sent via supply line 94 to lid block 37 thereby pressurizing the coffee in canister 30. The pressure forces coffee through pickup tube 75, coffee hose 53 and into conduit 65 in tower 60. The operator may then dispense coffee as needed through faucet 61 in individual servings or in bulk. The level probes 42 also inhibit the heat tape used to maintain the temperature of the coffee temporarily stored in dispensing hose 53 if the level falls below a predetermined threshold.

This cycle of brewing, transferring and dispensing brewed beverages can be repeated to achieve continuous, uninterrupted dispensing of large volumes of coffee.

In an alternative embodiment, the automated safety features can be manually performed.

What has been described therefore is a system and method for brewing and dispensing high volumes of brewed beverages that maintains a high quality product while maximizing efficiency. While a preferred embodiment of the present invention has been described, it is to be understood that the scope of the invention is defined by the following claims.

The embodiment of the invention in which an exclusive property or privilege is claimed are defined as follows:

1. A system for brewing and dispensing hot beverages comprising:

an urn having at least one liner for brewing a hot beverage at a brewing temperature;

at least one mobile storage canister for storing and transporting the hot beverage from one location to another location at a lower temperature than the brewing temperature;

a dispensing tap for dispensing the beverage;

a first transfer tube attachable between the urn and the canister for transferring the hot beverage from the urn to the canister;

a second transfer tube attachable between the canister and the dispensing tap for transferring the hot beverage from the canister to the dispensing tap; and a means for moving the hot beverage from the canister, through the second transfer tube, and to the dispensing tap.

2. The system of claim 1, further comprising a valve means for controlling the flow of the hot beverage in the first transfer tube.

3. The system of claim 1, herein said means for moving the hot beverage includes a means for pressurizing the beverage in the canister.

4. The system of claim 3, wherein said means for pressurizing includes a compressor, a supply line connected to the compressor and connectable to the canister, and control circuitry to control the compressor.

5. The system of claim 4, wherein the control circuitry includes means for sensing the beverage level in the canister and controlling the compressor in response thereto.

6. The system of claim 1, wherein the dispensing temperature is lower than the brewing temperature.

7. The system of claim 1, wherein the canister is insulated.

8. The system of claim 1, further comprising means for removably connecting the second transfer tube to the canister.

9. The system of claim 8, wherein the removable connecting means includes a quick coupling.

10. The system of claim 9, wherein the quick coupling includes an outlet block connected to the first transfer tube and a lid block connected to the canister, the outlet block being removably connectable to the lid block, the outlet block including a liquid outlet orifice.

11. The system of claim 10, wherein the outlet block further includes an air inlet orifice and electrical contacts arranged and configured for contact with the lid block.

12. The system of claim 11, wherein the liquid outlet orifice is positioned below the level of the air inlet orifice and the electrical contacts, the lid block being configured to receive the liquid from the liquid outlet orifice below its interface with the air inlet orifice and the electrical contacts.

13. The system of claim 1, further comprising a means for removably connecting the second transfer tube to the canister.

14. The system of claim 13, wherein the removable coupling means includes a quick coupling.

15. The system of claim 14, wherein the quick coupling includes an inlet block connected to the second transfer tube and a lid block connected to the canister, the inlet block being removably connectable to the lid block, the inlet block including a liquid inlet orifice.

16. The system of claim 15, wherein the inlet block further includes an air outlet orifice and electrical contacts arranged and configured for contact with the lid block.

17. The system of claim 16, wherein the liquid inlet orifice is positioned below the level of the air outlet orifice and the electrical contacts, the lid block being configured to engage the inlet orifice below its interface with the air outlet orifice and the electrical contacts.

18. The system of claim 1, wherein the second transfer tube is heated.

19. The system of claim 18, wherein the second transfer tube is heated by foil-backed heat tape wrapped around the second tube.

20. The system of claim 1, further comprising control circuitry for controlling the brewing and transferring of the beverage.

21. The system of claim 20, further comprising means for sensing the level of beverage in the canister.

22. The system of claim 21, wherein the control circuitry prevents the transfer of the beverage into the canister in response to a predetermined level of beverage in the canister.

23. The system of claim 1, wherein the canister includes a plurality of casters.

24. A system for brewing and dispensing a hot beverage comprising:

an urn having a plurality of beverage liners;

a plurality of insulated canisters for receiving the brewed beverage therein;

a plurality of first removable transfer tubes each respectively being capable of connection to one of the liners and one of the canisters;

a transfer valve in continuity with each respective first transfer tube for controlling beverage flow in the respective first transfer tube;

a dispensing tap;

a plurality of second removable transfer tubes each respectively being capable of connection to one of the dispensing taps and one of the canisters;

a means for pressurizing the beverage in each canister whereby the pressure causes the beverage to flow through the respective second transfer tube to the respective tap for dispensing; and control circuitry for controlling the brewing, transferring and dispensing of the beverage.

25. The system of claim 24, wherein the control circuitry compares the level of the beverage in the container to a predetermined level to control the transfer of beverage.

26. The system of claim 25, wherein the control circuitry compares the level of the beverage in the canister to a predetermined level to control the means for pressurizing.

* * * * *